US 7,027,984 B2

(12) United States Patent
Lemon

(10) Patent No.: US 7,027,984 B2
(45) Date of Patent: Apr. 11, 2006

(54) TONE-BASED MARK-UP DICTATION METHOD AND SYSTEM

(75) Inventor: Michael J. Lemon, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 854 days.

(21) Appl. No.: 09/810,908

(22) Filed: Mar. 15, 2001

(65) Prior Publication Data
US 2002/0169593 A1  Nov. 14, 2002

(51) Int. Cl.
*G10L 15/00* (2006.01)
(52) U.S. Cl. .................... 704/235; 704/275; 379/88.02; 709/217
(58) Field of Classification Search ................ 704/235, 704/275; 379/88.02; 709/217
See application file for complete search history.

(56) References Cited

U.S. PATENT DOCUMENTS 6,400,806 B1 * 6/2002 Uppaluru ................. 379/88.02
6,522,738 B1 * 2/2003 Cruickshank et al. .. 379/201.03
6,771,743 B1 * 8/2004 Butler et al. ............... 379/67.1

* cited by examiner

*Primary Examiner*—Daniel Abebe

(57) ABSTRACT

An automatic mark-up method and system for receiving a digital stream having at least one tone and responsive thereto for automatically generating a document with at least one mark-up command corresponding to the tone. First, a tone symbol file is generated based on the digital stream. The tone symbol file includes at least one tone symbol for representing the tone in the digital stream. Next, a marked-up document is automatically generated based on the tone symbol document. A different marked-up document can be generated depending on different context information.

7 Claims, 5 Drawing Sheets

Exemplary Digital Stream

Things that must be done by June 1. DTMF(2) Check with Research and Development to see if prototype will be ready. DTMF(3) Is there a mock-up we can use if not ready? DTMF(1) DTMF (1) DTMF(4) Obtain second round of venture capital. DTMF(3) Check with Acme Ventures to see if they are still interested. DTMF(1) DTMF(1) DTMF(2) Prepare press releases. DTMF(1)

*FIG.4*

Text File with Tone Symbols Example

Things that must be done by June 1. $TONE2 Check with Research and Development to see if prototype will be ready. $TONE3 Is there a mock-up we can use if not ready? $TONE1 $TONE1 $TONE4 Obtain second round of venture capital. $TONE3 Check with Acme Ventures to see if they are still interested. $TONE1 $TONE1 $TONE2 Prepare press releases. $TONE1

*FIG.5*

Corresponding XML file for "Meeting Report" Context

```
<?xml version="1.0"?>
<DOCUMENT>
Things that must be done by June 1.
<ITEM>
Check with Research and Development to see
if prototype will be ready.
<CONFIDENTIAL_DO_NOT_PRINT>
Is there a mock-up we can use if not ready?
</CONFIDENTIAL_DO_NOT_PRINT>
</ITEM>

<ITEM>
Obtain second round of venture capital.
<CONFIDENTIAL_DO_NOT_PRINT>
Check with Acme Ventures to see
if they are still interested.
</CONFIDENTIAL_DO_NOT_PRINT>
</ITEM>

<ITEM>
Prepare press releases.
</ITEM>
</DOCUMENT>
```

Corresponding XML file for "Meeting Agenda" Context

```
<?xml version="1.0"?>
<DOCUMENT>
Things that must be done by June 1.
<ACTION_ITEM>
Check with Research and Development to see
if prototype will be ready.
<FOOTNOTE>
Is there a mock-up we can use if not ready?
</FOOTNOTE>
</ACTION_ITEM>

<HIGH_PRIORITY_ACTION_ITEM>
Obtain second round of venture capital.
<FOOTNOTE>
Check with Acme Ventures to see
if they are still interested.
</FOOTNOTE>
</HIGH_PRIORITY_ACTION_ITEM>

<ACTION_ITEM>
Prepare press releases.
</ACTION_ITEM>
</DOCUMENT>
```

FIG.6

Corresponding XML file for "Meeting Agenda" Context

```
<?xml version="1.0"?>
<DOCUMENT>
Things that must be done by June 1.
<ACTION_ITEM>
Check with Research and Development to see
if prototype will be ready.
<FOOTNOTE>
Is there a mock-up we can use if not ready?
</FOOTNOTE>
</ACTION_ITEM>

<HIGH_PRIORITY_ACTION_ITEM>
Obtain second round of venture capital.
<FOOTNOTE>
Check with Acme Ventures to see
if they are still interested.
</FOOTNOTE>
</HIGH_PRIORITY_ACTION_ITEM>

<ACTION_ITEM>
Prepare press releases.
</ACTION_ITEM>
</DOCUMENT>
```

FIG. 7

TONE-BASED MARK-UP DICTATION METHOD AND SYSTEM

FIELD OF THE INVENTION

The present invention relates generally to dictation systems, and more particularly, to a tone-based mark-up dictation method and system.

BACKGROUND OF THE INVENTION

Recently, there has been increased interest in software products that expedite common-place tasks found in the workplace and that make workers more efficient in doing their jobs. One such area of office-productivity software is related to voice-recognition software. Voice-recognition software attempts to stream-line the word-processing process by converting spoken words to a text file without requiring a user or assistant to manually type the words into a document. Voice-recognition software is also known as speech recognition software, voice transcription software, or dictation software.

One example of voice-recognition software is Via Voice voice-recognition software available from International Business Machines Corporation (IBM) of Armonk, N.Y. Another commercially available voice-recognition software is Dragon Naturally Speaking voice-recognition software, which is available from Dragon Systems, Inc. of Newton, Mass.

Initially, the voice-recognition software generated a text file that often had many mistakes. Some users found that it took longer to correct the errors in the dictated text than to type or have someone else type the document from scratch. However, in the past several years there have been significant strides made in improving the accuracy of the voice-recognition software through the use of training files, more sophisticated speech recognition algorithms, and more powerful computer systems.

With the increasing use of mark-up languages, such as the Extensible Markup Language (XML), it is desirable for there to be a mechanism that provides the capability of adding mark-up tags to a document in an efficient, easy-to-use, effective, and user-friendly manner.

Unfortunately, marking up the dictated text with voice-recognition software has much to be desired. Currently, marking up the dictated text can be performed manually, which is simply generic word processing, or can be performed by verbal commands spoken by the user. For example, a user might speak "New Paragraph" to start a new paragraph and "New Line" to start a new line. Similarly, formatting commands are employed to apply a specified format, such as Bold, Italics, and Underline to dictated text during dictation or during review of dictated text.

One disadvantage of such systems is that commands to process the transcribed text are often misunderstood by the system, thereby injecting mistakes into the dictation process and causing user frustration. For example, the dictation system may mistakenly interpret a command as a word to be inserted into the document or may mistakenly interpret a word to be inserted into the document as a command. Furthermore, the dictation system may confuse two commands that sound alike, such as "Italics" and "Initial Cap".

Moreover, such prior art systems do not allow a user to vary commands based on predefined contexts. In fact, such systems are not context sensitive (i.e., there is no mechanism to vary the meaning of a command when a context changes). For example, when a user speaks a command, such as "center", the command always will mean center the current word regardless of the type of document. Unfortunately, since the type of document often varies widely in terms of intended audience, content of the message, tone of the message, etc. (hereinafter referred to as "context"), users may need a single command to mean different things depending on the specific context for the document. Consequently, it would be desirable for a dictation system to have a reliable and efficient mechanism to affect the document and apply one or more changes to the document based on a common command and the context of the document.

Based on the foregoing, there remains a need for a tone-based mark-up dictation method and system that overcomes the disadvantages set forth previously.

SUMMARY OF THE INVENTION

One aspect of the present invention is to provide a method and system for increasing the speed, ease, and accuracy of marking up dictated speech.

Another aspect of the present invention is to provide a method and system for automatically converting a common text file with tone symbols to different marked-up documents depending on the context of the document.

Yet another aspect of the present invention is to provide a method and system for using tones to mark-up dictated text. Tones are less likely to be misinterpreted by voice recognition software than spoken user commands.

Another aspect of the present invention is to provide a method and system for using tones to automatically add mark-up tags to a document that is efficient, easy-to-use, effective, and user-friendly.

According to one embodiment of the present invention, a tone-based mark-up dictation method is described. First, a digital stream having at least one tone is received. The digital stream can, for example, be an audio digital stream having spoken words dictated by a user and one or more tones. Second, a tone symbol document is generated based on the digital stream. The tone symbol document includes at least one tone symbol for representing the tone in the digital stream. Next, a marked-up document is automatically generated based on the tone symbol document. A different marked-up document can be generated depending on different context information.

According to another embodiment of the present invention, a tone-based automatic mark-up dictation system is described. The dictation system has a tone symbol document generator for receiving a digital stream having at least one tone and responsive thereto for generating a tone symbol document having a plurality of words and a tone symbol corresponding to the tone based on a tone mapper. The dictation system also has a mark-up document generator that is coupled to the tone symbol document generator for receiving the tone symbol document and responsive thereto for automatically generating a marked-up document that has at least one mark-up command that corresponds to the tone symbol.

BRIEF DESCRIPTION OF THE DRAWINGS

The present invention is illustrated by way of example, and not by way of limitation, in the figures of the accompanying drawings and in which like reference numerals refer to similar elements.

FIG. 4 illustrates an exemplary digital stream having tones.

FIG. 5 illustrates a tone symbol document that corresponds to the digital stream of FIG. 4 that can be generated by the tone symbol document generator of the present invention.

FIG. 6 illustrates a marked-up language document that corresponds to the tone symbol document of FIG. 5 for a "meeting report" context that can be generated by the mark-up document generator.

FIG. 7 illustrates a mark-up language document that corresponds to the tone symbol document of FIG. 5 for a "meeting agenda" context that can be generated by the mark-up document generator.

DETAILED DESCRIPTION OF THE PREFERRED EMBODIMENT

A method and system for a tone-based markup dictation are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The dictation system of the present invention includes a front-end pipeline for generating a tone symbol document (e.g., dictated text with one or more tone symbols), which is described in greater detail hereinafter with reference to FIG. 1, and a back-end pipeline for processing the tone symbol document to generate a marked-up document, which is described in greater detail hereinafter with reference to FIG. 2.

Front-end Pipeline 100

Figure 1:
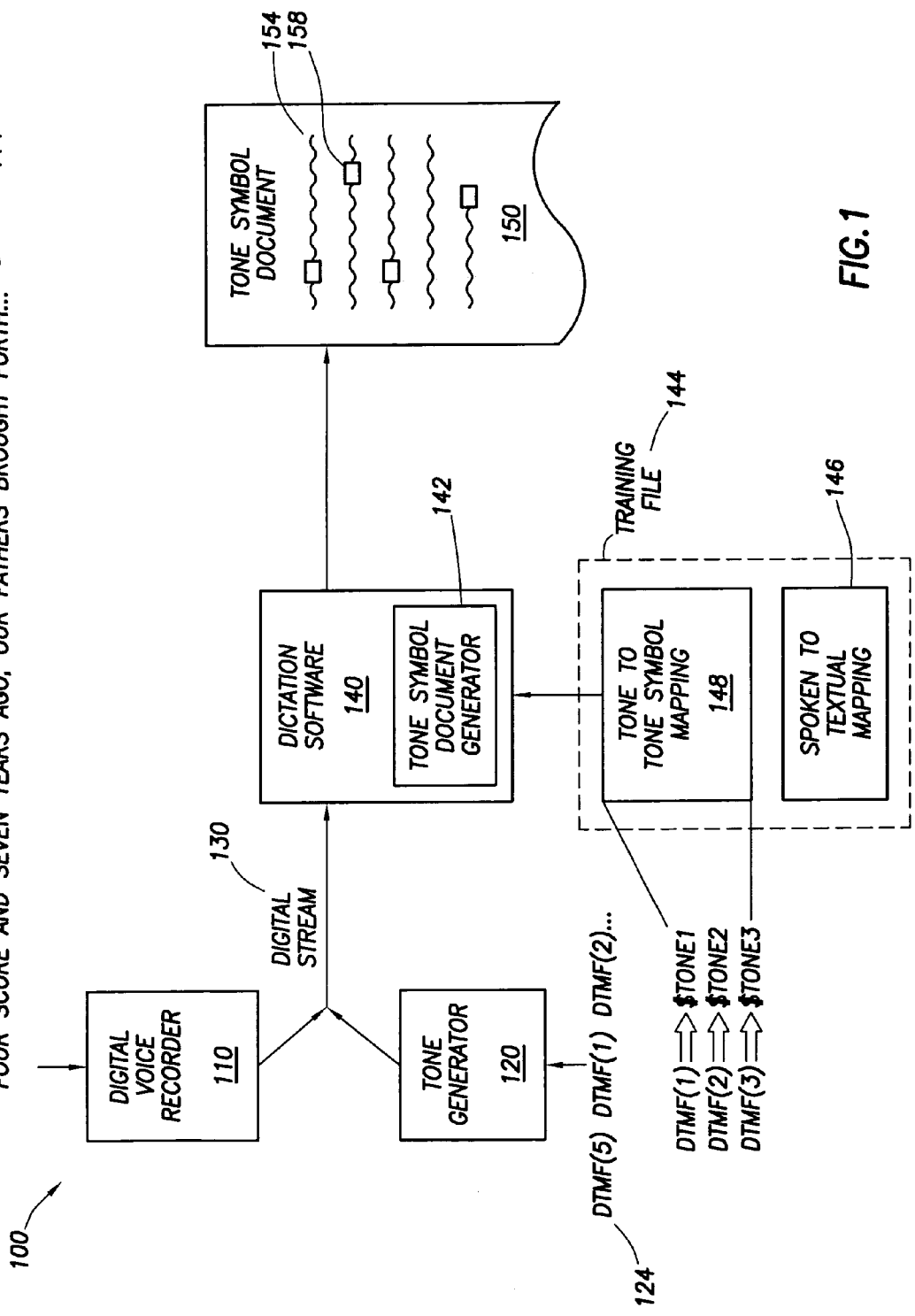
FIG. 1 illustrates a front-end pipeline of a dictation system in accordance to one embodiment of the present invention can be utilized.

FIG. 1 illustrates a front-end pipeline 100 according to one embodiment of the present invention. The front-end pipeline 100 includes a digital voice recorder 110 for generating a digital stream 130 of sounds (e.g., a phrase 114 dictated by a user) and a tone generator 120 for generating one or more tones. In this example, the tones may be DTMF tones 124.

Voice Recorder 110

The voice recorder 110 may be a standard off-the-shelf digital recorder, such as the Olympus DS-150 recorder, a recorder that is specifically designed to interact with dictation software, or a microphone (e.g., a mirco-phone headset) for use in recording dictated speech.

Most dictation/transcription software recommend a high quality input stream, such as an input stream provided by a digital recorder, for optimal results and performance.

Tone Generator 120

The tone generator 120 may be a Dual Tone Multi-Frequency (DTMF) tone generator. An example of a DTMF tone generator is a touch-tone dialer that are typically employed to access touch-tone menus from a rotary-dial telephone. Although DTMF tones are a convenient set of standard tones, it is noted that the tone generator 120 is not limited to a DTMF tone generator. For example, any set of distinct tones that the dictation software 140, which is described in greater detail hereinafter, can distinguish can be utilized. In principle, if the user had perfect pitch, a user could whistle a needed tone.

A DTMF-style tone generator typically has only twelve tones that correspond to the twelve keys on a touch-tone phone. However, it is noted that the tone generator 120 is not limited to generating twelve tones. Furthermore, the present invention is not limited to using only twelve tone and the corresponding tone symbols or markers. It is further noted that the number of tones, the number of corresponding tone symbols, and the type of tones can be varied to suit a particular application.

In alternative embodiments, a combination of tones (e.g., sequence of tones) can be employed to indicate additional marks as needed in a manner similar to the way that Control and Meta keys extend the number of keys that can be typed on a standard computer keyboard.

It is noted that the tone generator 120 can be implemented separate from the digital voice recorder 110. In an alternative embodiment, the tone generator 120 can be integrated with the digital voice recorder 110.

The digital stream 130 of FIG. 1 includes (a) the user's recorded spoken words 114 and (b) the tones 124 being invoked by the user. The merging of dictated speech 114 with the tones 124 may be accomplished acoustically by providing the tone generator 120 with a speaker whose output can be detected by the digital recorder's microphone. Alternatively, in the case where the recorder 110 employs a headset microphone, the tone-generator 120 can directly provide its signal to the recorder 110 by splicing into the microphone connector. In either case, the merging of spoken text and tones is a straightforward task.

Dictation Software 140

The front-end pipeline 100 also includes dictation software 140. The dictation software 140 may be a standard off-the-shelf product such as IBM's ViaVoice voice-recognition software or Dragon System's Naturally Speaking voice-recognition software. Alternatively, the dictation software 140 may be a custom application developed in a language, such as VoiceXML that is established by the World Wide Web Consortium (W3C). VoiceXML is a standard that describes a language for building voice-based applications (e.g., voice-enabled Web pages).

It is important for the dictation software 140 to be able to distinguish from among the tones emitted by the tone generator 120. Consequently, the criteria for selecting candidate tones to be used in the system 100 is that the tones be distinguishable by the dictation software 140.

For example, if the candidate tones are notes on a treble clef musical scale (e.g., notes A, B-flat and B), and the dictation software 140 can distinguish note A from note B, but could not distinguish note A from note B-flat or note B-flat from note B, then notes A and B are acceptable tones, but note B-flat is not acceptable and not included in the set of usable tones.

Prior to or during the use of dictation software 140, a user typically "trains" the software by dictating a portion of text that is known to the software 140 and correcting (either manually or through re-dictation of the misinterpreted words) the software 140 for errors in transcription. The training process allows the dictation software 140 to produce a spoken-to-textual mapping 146 that the system 100 saves for use during subsequent processing and dictation sessions.

Tone Symbol Document Generator 142

The dictation software 140 has a tone symbol document generator 142 of the present invention for receiving the digital stream 130 with at least one tone and responsive thereto for generating a tone symbol document 150. Specifically, a tone symbol document generator 142 converts each tone in the digital stream into a corresponding tone symbol.

A tone symbol is a single character or multi-character sequence that represents a single tone. These tone symbols are unique indicators that can be distinguished from the ordinary words transcribed by the dictation software 140. In some examples that follow, exemplary tone symbols, "$TONE1", "$TONE2", etc. are employed as distinct place holders. The tone symbol document 150 has text 154 and a tone symbol 158 corresponding to each tone in the digital stream 130. For example, the tone symbol document 150 can be the following: "Four score and seven $TONE5 years ago $TONE1 our fathers $TONE2 brought forth . . . ."

At this stage of the pipeline, the tone symbols 158 (e.g., tone symbol $TONE2) is context independent (i.e., the actual meaning or corresponding mark-up commands is not yet assigned to the tone symbol). Consequently, the tone symbol 158 at this point serves to indicate where in the digital stream 130 a tone occurred.

Training File 144

The system 100 also has a training file 144 for storing both the spoken to textual mapping 146 that was described above and a tone to tone symbol mapping 148. The tone to tone symbol mapping 148 provides a mapping of tones to tone symbols. The tone to tone symbol mapping 148 can, for example, be consulted by the tone symbol document generator 142 to determine a tone symbol corresponding to a particular tone in the digital stream 130.

One manner to create a tone to tone symbol mapping 148 is to teach or train the dictation software about the tones. For example, a user can play a tone and then indicate a corresponding tone symbol in much the same way as a user trains the dictation software 140 the proper spelling of a word that the software 140 has mistakenly transcribed.

Back-end Pipeline 200

Figure 2:
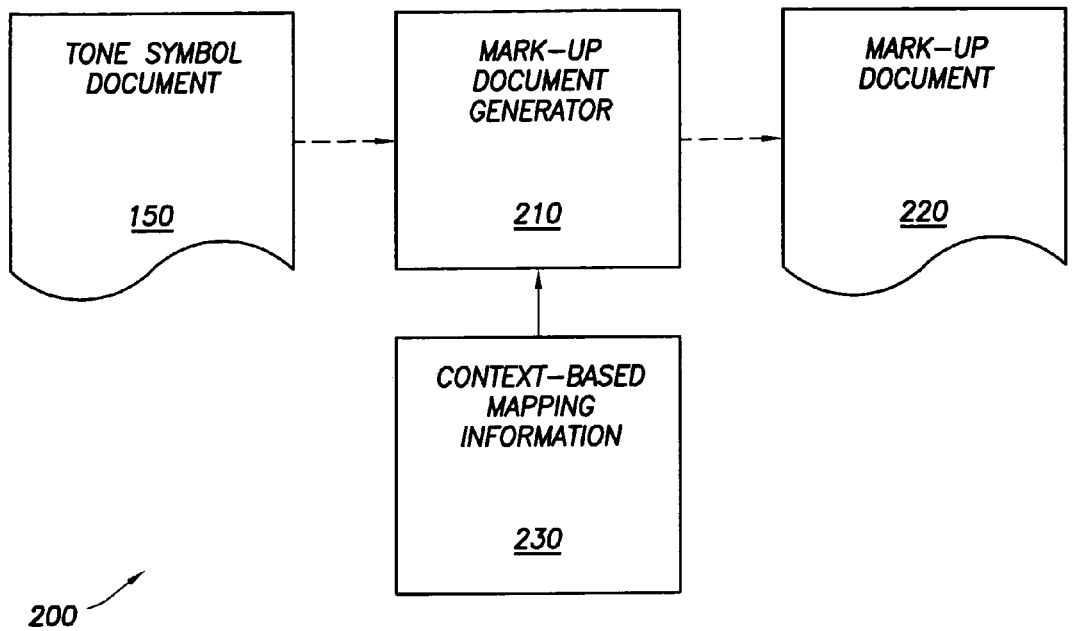
FIG. 2 is a block diagram that illustrates a back-end pipeline of a dictation system in accordance with one embodiment of the present invention.

FIG. 2 illustrates a back-end pipeline 200 according to one embodiment of the present invention. The input for the back-end pipeline is (a) the tone symbol document 150 that was created by the front-end pipeline 100, and (b) a context file 230 that contains symbol-to-tag mapping information. Context as used here refers to the desired style of the resulting marked-up document. Examples of possible contexts include, but are not limited to, Financial Report, Meeting Agenda, or Grocery List. Each of these contexts has context-specific XML tags associated with each tone symbol.

For example, the Financial Report context may employ YEAR-TO-DAY, QUARTERLY-REPORT and CONFIDENTIAL mark-up tags. A Meeting Agenda context may use various ACTION-ITEM tags which, in turn, have associated HIGH_PRIORITY, MEDIUM_PRIORITY, etc. tags.

The back-end pipeline 200 includes a mark-up document generator 210. The mark-up document generator 210 receives context-based mapping information in the file 230 and builds a mark-up language document 220 (e.g., an XML document) by inserting corresponding mark-up commands (e.g., XML tags) as it encounters the tone symbol sequence. By convention, one of the tone symbols serves as an "end marker" which terminates the most nested marker level.

One aspect of the present invention is the provision of a tone-based mark-up facility for automatically generating marked-up documents based on a digital stream having at least one tone. The tone-based mark-up facility automatically generates one or more mark-up commands for each tone detected. The mark-up command can, for example, be applied to text that is transcribed by dictation software. As described hereinabove, the specific mark-up command or commands can vary depending on the context.

In one embodiment, the tone-based mark-up facility includes the tone symbol document generator 142 and the mark-up document generator 210. The tone symbol document generator 142 generates a tone symbol document based on a received audio stream with at least one tone. The mark-up document generator 210 receives the tone symbol document and based thereon automatically generates a marked-up language document (e.g., an XML document).

Tone Symbol Processing

Figure 3:
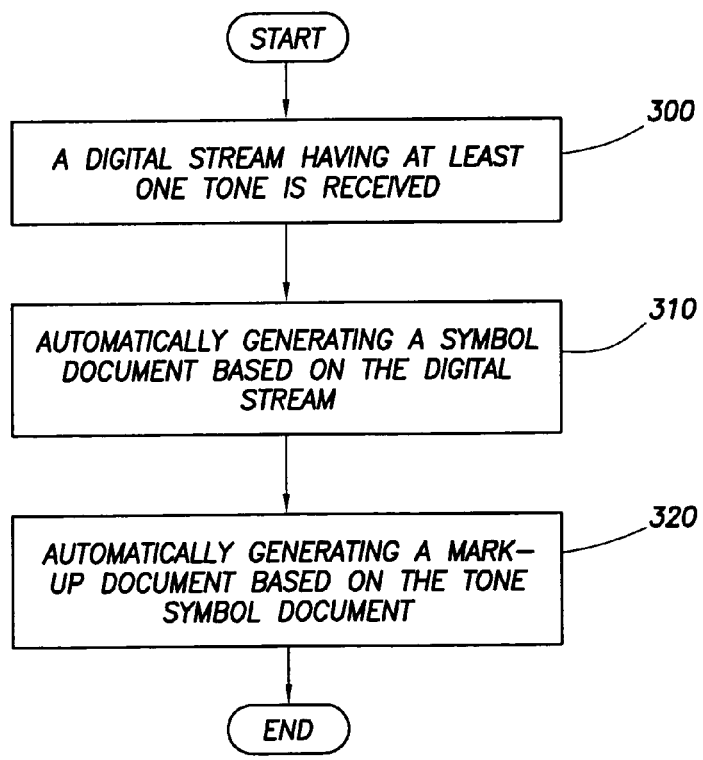
FIG. 3 is a flowchart of the processing performed to convert tone symbols to tags in accordance with one embodiment of the present invention.

FIG. 3 is a flowchart illustrating a process for converting Tone Symbols to mark-up commands according to one embodiment of the present invention. In step 300, a digital stream 130 (e.g., an digital audio stream with dictated words) that has at least one tone is received. In step 310, a tone symbol document 150 is automatically generated based on the digital stream 130. The tone symbol document 150 includes at least one tone symbol 158 for representing the tone in the digital stream. In step 320, a marked-up document 220 is automatically generated based on the tone symbol document 150. In step 320, context information 230 may be supplied to select from one or more sets of mark-up commands. In this manner, a different marked-up document can be generated from the same tone symbol document depending on different context information.

Sample Digital Stream with Tones

FIG. 4 illustrates an exemplary digital stream having tones. For example, in the dictated portion there are four tones (DTMF(1), DTMF(2), DTMF(3), DTMF(4)) that are employed.

FIG. 5 illustrates a text file with tone symbols (i.e., an exemplary tone symbol document 150) that corresponds to the digital stream of FIG. 4 that can be generated by the tone symbol document generator 142 of the present invention. It is noted that each of the tones is replaced by a corresponding tone symbol—$TONE1, $TONE2, $TONE3, and $TONE4.

FIG. 6 illustrates a mark-up language file (i.e., an exemplary marked-up document 220) for a "meeting report" context that corresponds to the text file with tone symbols of FIG. 5. It is noted that the marked-up document 220 can be generated by the mark-up document generator 210. It is further noted that each tone symbol in the "meeting report" context is associated with certain mark-up commands (e.g., a CONFIDENTIAL_DO_NOT_PRINT command and an ITEM command).

FIG. 7 illustrates a mark-up language file (i.e., another exemplary marked-up document 220) for a "meeting agenda" context that corresponds to the text file with tone symbols of FIG. 5. It is noted that each tone symbol in the "meeting agenda" context is associated with certain mark-up commands (e.g., a ACTION_ITEM command, HIGH_PRIORITY_ACTION_ITEM, and a FOOTNOTE command) that are different from the "meeting agenda" context.

For example, in the "Meeting Report" context a tone symbol $TONE3 is converted into a CONFIDENTIAL_DO_NOT_PRINT mark-up command, whereas in the "Meeting Agenda" context, the tone symbol $TONE3 is converted into a FOOTNOTE mark-up command. In this manner different marked-up documents can be generated from the same tone symbol document based on a specified context.

Exemplary Software Code

An example of software code to process a file with tone symbols and to automatically convert a tone symbol document 150 to a marked-up document 220 with context-sensitive or context dependent mark-up commands is provided hereinbelow.

```
Main: open and read Context_Map from Context_File;
open Input_File;
open Output_File;
write Document_Begin to Output_File;
Loop: read Word from Input_File;
if End-of-File on Input_File then {
close Input_File;
close Context_File;
write Document_End to Output_File;
close Output_File;
exit;
}
if Word is NOT a Tone-Symbol then {
write Word to Output_File;
goto Loop:
}
if Word is a Tone-Symbol then {
lookup Tag_Info for Word in Context_Map;
If (Tag_Info is EndMark) Then {
% Comment: close of this XML tag;
write endtag(Tag_Info) to Output_File;
Goto Loop;
}
% Comment: Otherwise start new XML tag;
write begintag(Tag_Info)
goto Loop;
}
```

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A dictation system comprising:
dictation software for receiving a stream of voice information and responsive thereto for generating text corresponding to the voice information; and
a tone-based mark-up facility for receiving at least one tone and automatically converting each tone into one or more mark-up commands that operate on the text;
wherein the tone-based mark-up facility includes a tone symbol document generator for receiving a digital stream having at least one tone and responsive thereto for generating a tone symbol document having a plurality of words and a tone symbol corresponding to each and the tone-based mark-up facility also includes a mark-up document generator coupled to the tone symbol document generator for receiving the tone symbol document and responsive thereto for automatically generating a marked-up document that has at least one mark-up command that corresponds to the tone symbol;
wherein the mark-up document generator receives context information and selectively converts each tone symbol into one or more mark-up commands based on the context information.

2. A dictation system comprising:
dictation software for receiving a stream of voice information and responsive thereto for generating text corresponding to the voice information; and
a tone-based mark-up facility for receiving at least one tone and automatically converting each tone into one or more mark-up commands that operate on the text;
wherein the tone-based mark-up facility includes a tone symbol document generator for receiving a digital stream having at least one tone and responsive thereto for generating a tone symbol document having a plurality of words and a tone symbol corresponding to each and the tone-based mark-up facility also includes a mark-up document generator coupled to the tone symbol document generator for receiving the tone symbol document and responsive thereto for automatically generating a marked-up document that has at least one mark-up command that corresponds to the tone symbol;
wherein the mark-up document generator generates a first mark-up command when the context information specifies a first context and a second mark-up command when the context information specifies a second context.

3. A system for automatically generating marked-up documents based on a digital stream having at least one tone comprising:
dictation software for receiving the digital stream and responsive thereto for generating corresponding text; and
a tone-based mark-up facility for receiving the digital stream, converting each tone in the digital stream into a tone symbol, and converting each tone symbol into at least one mark-up command based on context information.

4. The system of claim 3 wherein the tone-based mark-up facility includes
a tone symbol document generator for receiving the digital stream having at least one tone and responsive thereto for generating a tone symbol document having a plurality of words and a tone symbol corresponding to each tone; and
a mark-up document generator coupled to the tone symbol document generator for receiving the tone symbol document and responsive thereto for automatically generating a marked-up document that has at least one mark-up command that corresponds to the tone symbol.

5. The mark-up system of claim 4 wherein the mark-up document generator receives the context information and selectively converts each tone symbol into one or more mark-up commands based on the context information.

6. The mark-up system of claim 4 wherein the mark-up document generator generates a first mark-up command when the context information specifies a first context and a second mark-up command when the context information specifies a second context.

7. The dictation system of claim 3 further comprising:
a source for generating tones; and
a recorder for receiving spoken words and generating a corresponding audio stream.

* * * * *